Nov. 25, 1924.
E. SCOTT
1,516,989
SELF FEEDING POULTRY HOPPER
Filed Oct. 17, 1923    2 Sheets-Sheet 1
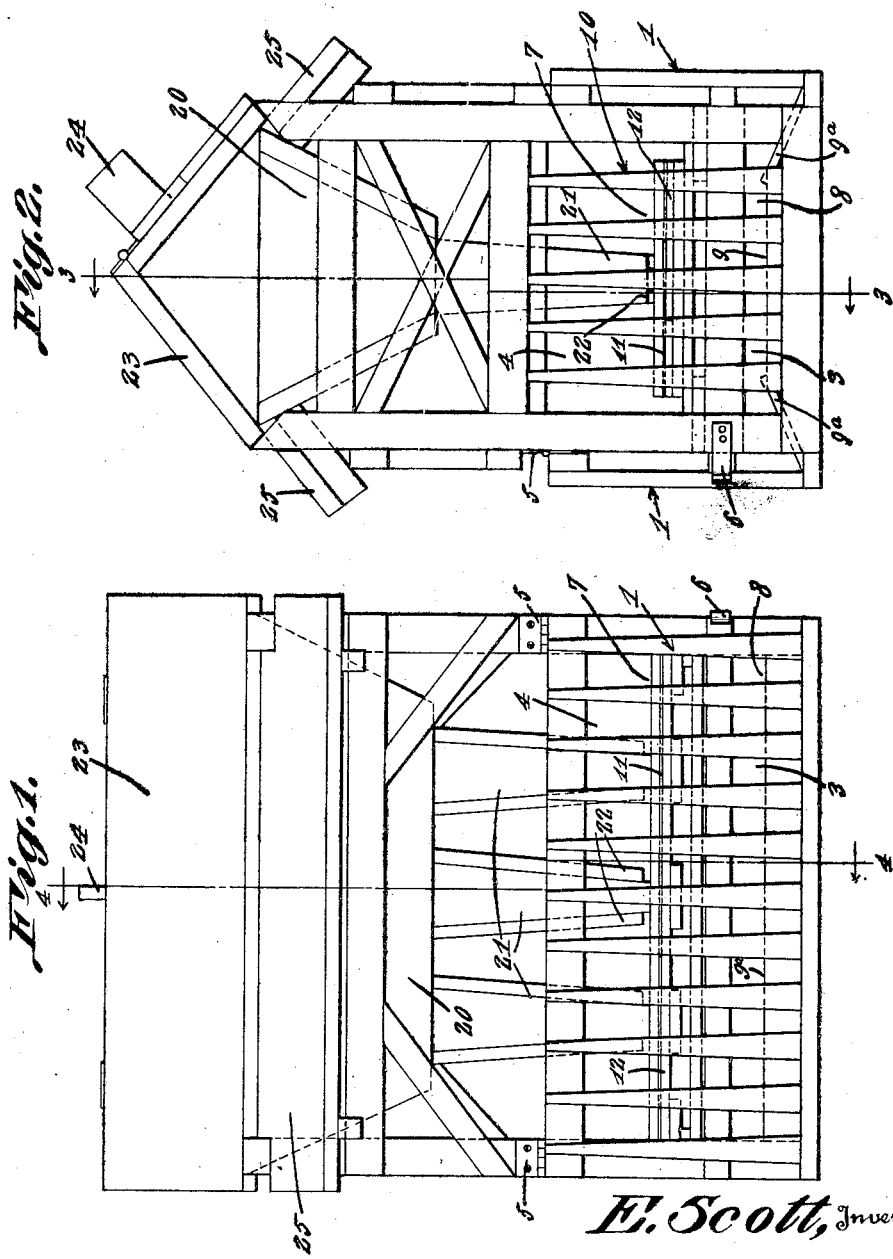
E. Scott, Inventor
By C. A. Snow & Co.
Attorneys Nov. 25, 1924.
E. SCOTT
1,516,989
SELF FEEDING POULTRY HOPPER
Filed Oct. 17, 1923   2 Sheets-Sheet 2
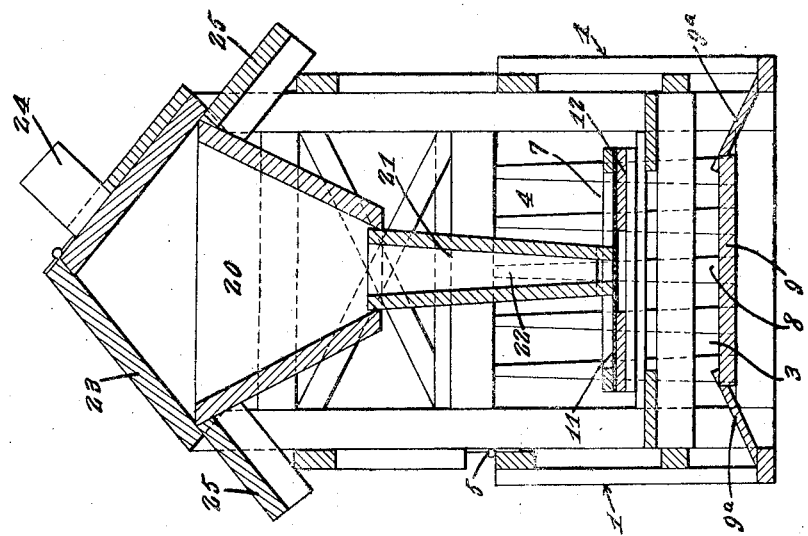
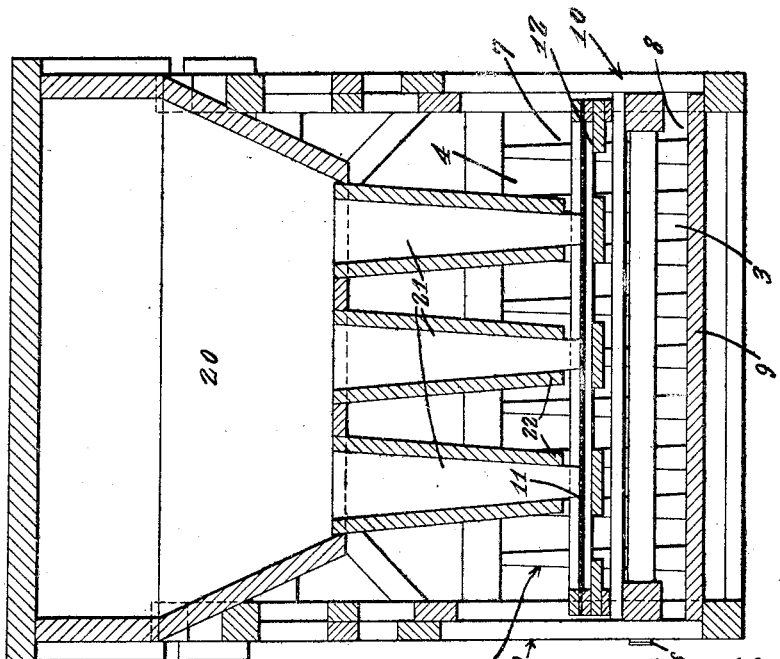
E. Scott, Inventor Patented Nov. 25, 1924.

1,516,989

UNITED STATES PATENT OFFICE.

EVERETT SCOTT, OF MADISON, ARKANSAS.

SELF-FEEDING POULTRY HOPPER.

Application filed October 17, 1923. Serial No. 669,118.

*To all whom it may concern:*

Be it known that I, EVERETT SCOTT, a citizen of the United States, residing at Madison, in the county of St. Francis and State of Arkansas, have invented a new and useful Self-Feeding Poultry Hopper, of which the following is a specification.

This invention relates to poultry feeders of the automatic types.

The object of the invention is to provide a feed hopper so constructed that large and small feed may be placed together in the hopper and in which the fine or baby chick feed will sift through to a feeding compartment which is not accessible to the large fowls, leaving the large feed where the large fowl can easily reach it thus combining in a single structure a feeder for both large and small poultry.

Another object is is to provide a feeder of this character the parts of which may be disassembled for cleaning and other purposes.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a side elevation of a feeder constructed in accordance with this invention.

Fig. 2 is an end elevation thereof.

Fig. 3 is a central longitudinal section taken on the line 3—3 of Fig. 2; and

Fig. 4 is a central transverse section taken on the line 4—4 of Fig. 1.

In the embodiment illustrated a suitable supporting frame is shown having slatted side and end members 1 and 10 respectively the slots of which are spaced apart and tapered toward their upper ends to provide openings 3 at the lower portion of the feeder which are smaller than those 4 at the upper portion. The openings 3 are of a size to afford access therethrough for the baby chicks while those 4 permit the insertion therethrough of the heads of larger poultry, the openings 3 being too small for this purpose.

The slatted side 1 at one side of the feeder is preferably hinged at its upper end as shown at 5 to adapt said side to swing outward to permit access to the interior of the feeding compartments 7 and 8 which are designed respectively to contain feed for large and small fowl. This hinged side 1 is held releasably in position by a spring catch 6 carried by one of the corner posts of the frame and adapted to snap over one end of the member 1 as is shown clearly in Figs. 1 and 2. The lower feeding compartment 8 which is intended for baby chicks or other small poultry and the upper compartment 7 are separated by a horizontally disposed screen 11 mounted on suitable cross bars 12 and through which the feed supplied from hopper 20 is sifted into the compartment 8 for use of the baby chicks. The larger feed remains on the screen and is accessible to larger fowl. The feed holding tray 9 in compartment 8 has downwardly inclined platforms 9ª leading thereto the upper edges of which project above the side edges of the tray and prevent the feed from being scratched out by the baby chicks.

The hopper 20 which is removably mounted in the supporting frame above compartment 7 has a plurality of discharge spouts 21 extending from the bottom of the hopper to the screen 11 with their lower ends resting on said screen. Two of the opposed walls 22 of the spouts are cut away at their lower ends to permit the feed to pass out onto the screen.

The hopper 20 has a gable roof one side 23 of which is hinged at its apex to permit filling of the hopper, a stop 24 being provided to limit the opening movement of the closure 23. Weather shields or guards 25 incline downwardly and extend at their inner edges under the lower edges of the roof so that water will be shed and thus protect the contents of the feeder.

It will be obvious that this feeder may be of any desired size and may be constructed of any suitable material. The hopper being removable from the supporting structure and the spouts removable from the hopper facilitates cleaning of the apparatus.

The screen 11 is also removable, access thereto being had by opening the hinged side member 1.

Various changes in the form, shape, proportion and other minor details of construction may be made without departing from the principle or sacrificing any of the advantages of the claimed invention.

I claim:—

1. In an automatic poultry feeder, a supporting structure having upper and lower feeding compartments with a horizontally disposed screen between them, a hopper mounted in said structure above said compartments with spouts leading therefrom and discharging onto said screen, said hopper having a gable roof one member of which is hinged to afford access to the hopper, and shields inclining downwardly and outwardly from a point adjacent the lower edges of said roof.

2. In an automatic poultry feeder, a supporting structure equipped with slatted end and side members, the slats tapering toward their upper ends to provide spaces between them decreasing in width toward the lower ends thereof, upper and lower feeding compartments with a screen arranged between them, the lower compartment having a tray with downwardly inclined platforms leading therefrom and projecting at their upper edges over said tray to form guards for retaining feed therein.

In testimony that I claim the foregoing as my own, I have hereto affixed my signature in the presence of two witnesses.

EVERETT SCOTT.

Witnesses:
R. L. PURNELL,
W. T. JONES.